US010051102B2

(12) United States Patent
Guenkova-Luy et al.

(10) Patent No.: US 10,051,102 B2
(45) Date of Patent: Aug. 14, 2018

(54) TELEMATIC SYSTEM WITH MULTIPLE NETWORK ACCESS DEVICES IN A MULTI-NETWORK ENVIRONMENT

(71) Applicant: Harman Becker Automotive Systems GmbH, Karlsbad (DE)

(72) Inventors: Teodora Guenkova-Luy, Ulm (DE); Martin Clauss, Ummendorf (DE); Ralph Goeckelmann, Dornstadt (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 40 days.

(21) Appl. No.: 14/852,377

(22) Filed: Sep. 11, 2015

(65) Prior Publication Data
US 2016/0080543 A1  Mar. 17, 2016

(30) Foreign Application Priority Data

Sep. 12, 2014  (EP) .................................... 14184557

(51) Int. Cl.
*H04W 4/00* (2018.01)
*H04W 76/10* (2018.01)
(Continued)

(52) U.S. Cl.
CPC ...... *H04M 1/72522* (2013.01); *H04L 67/125* (2013.01); *H04W 4/021* (2013.01);
(Continued)

(58) Field of Classification Search
CPC ..... H04W 48/18; H04W 76/02; H04W 4/021; H04W 4/02; H04W 4/00; H04W 76/10;
(Continued)

(56) References Cited

U.S. PATENT DOCUMENTS 9,426,641 B1 *  8/2016  Ghoshal ................ H04W 12/08
9,439,025 B1 *  9/2016  Ghoshal ................. H04W 8/20
(Continued)

FOREIGN PATENT DOCUMENTS

| EP | 1921876 A1 | 5/2008 |
| EP | 2637380 A1 | 9/2013 |
| WO | 2011100269 A1 | 8/2011 |

OTHER PUBLICATIONS

European Patent Office, Extended European Search Report Issued in Application No. 14184557.8, dated Mar. 11, 2015, Germany, 5 pages.

*Primary Examiner* — Khawar Iqbal
(74) *Attorney, Agent, or Firm* — McCoy Russell LLP (57) ABSTRACT

The present disclosure relates to controlling a terminal system. An example computer-implemented method for controlling a terminal system, which is connectable to multiple provider networks and comprises multiple network access devices (NADs) and a computer system, includes reading information on the physical and/or logical location of the terminal system, reading user configurations and provider service layer agreements, and, based on the read information, user configurations, and provider service layer agreements, creating associations between applications to be run on the NADs or the terminal system, the NADs, and the multiple provider networks. The example method further includes, based on the created associations and the information on the physical and/or logical location of the terminal system, selecting one of the NADs and one of the provider networks for running one of the applications on the selected NAD and connecting the selected NAD with the selected provider network.

19 Claims, 3 Drawing Sheets

(51) Int. Cl.
*H04L 29/08* (2006.01)
*H04M 1/725* (2006.01)
*H04W 4/021* (2018.01)
*H04W 76/02* (2009.01)
*H04W 48/18* (2009.01)

(52) U.S. Cl.
CPC .......... *H04W 48/18* (2013.01); *H04W 76/02* (2013.01); *H04W 76/10* (2018.02)

(58) Field of Classification Search
CPC ... H04L 29/08; H04L 67/125; H04M 1/72522
USPC ....................................................... 455/450
See application file for complete search history.

(56) References Cited

U.S. PATENT DOCUMENTS

| | | | |
|---|---|---|---|
| 2005/0124338 A1 | 6/2005 | Benco et al. | |
| 2006/0239282 A1* | 10/2006 | Dick | H04L 12/4633 370/401 |
| 2008/0268866 A1 | 10/2008 | Sukkarie | |
| 2010/0311468 A1* | 12/2010 | Shi | H04W 4/003 455/558 |
| 2011/0199962 A1* | 8/2011 | Kahn | H04L 12/5692 370/328 |
| 2013/0237209 A1* | 9/2013 | Guenkova-Luy | H04L 67/12 455/420 |
| 2014/0164582 A1* | 6/2014 | Dawson | H04W 48/18 709/221 |
| 2014/0194149 A1* | 7/2014 | Lavi | H04W 88/06 455/458 |
| 2015/0358807 A1* | 12/2015 | Gorey | H04W 8/12 455/432.1 |
| 2015/0373530 A1* | 12/2015 | Stein | H04L 63/0853 455/411 |
| 2016/0109246 A1* | 4/2016 | Lambert | G01C 21/32 701/450 |
| 2016/0109582 A1* | 4/2016 | Sendonaris | G01S 19/10 455/456.1 |
| 2016/0135039 A1* | 5/2016 | Droste | H04W 8/205 455/418 |
| 2016/0269888 A1* | 9/2016 | Ljung | H04W 48/16 |
| 2017/0118625 A1* | 4/2017 | Miao | H04W 8/18 |
| 2017/0251020 A1* | 8/2017 | Plestid | H04L 63/18 |
| 2017/0251515 A1* | 8/2017 | Altman | H04W 76/045 |

* cited by examiner

TELEMATIC SYSTEM WITH MULTIPLE NETWORK ACCESS DEVICES IN A MULTI-NETWORK ENVIRONMENT

CROSS REFERENCE TO RELATED APPLICATIONS

The present application claims priority to European Patent Application No. EP14184557, entitled "TELEMATIC SYSTEM WITH MULTIPLE NETWORK ACCESS DEVICES IN A MULTI-NETWORK ENVIRONMENT" and filed on Sep. 12, 2014, the entire contents of which are hereby incorporated by reference for all purposes.

FIELD

The present disclosure relates to telematic systems, in particular, automotive telematic systems, wherein a plurality of Network Access Devices is provided for a variety of applications making use of one or more media in a multi-network environment.

BACKGROUND

Telecommunication by mobile services may be available in various environments. The general application of such services is indicated as telematics, which refers to the integrated application of telecommunications and informatics, whereby technologies for sending, receiving, and storing information via telecommunication devices are put into operation for realization, for example, of home and business applications. For example, in the automotive environment vehicular infotainment and telematics are offered via multiple devices, including devices installed in the vehicle and mobile devices carried by a user and optionally connected to a vehicle communication system. For example, mobile devices may include Personal Digital Assistants and mobile phones.

Current telematic systems installed in an automobile (automotive telematics systems) are adapted to control multiple network access devices (NADs) that are installed in the automobile (e.g., a built-in telephone) and/or that are mobile devices connectable with a computational unit of the telematic system via a wireless technology (e.g., Bluetooth or WLAN). The NADs may belong to different providers providing services with different payment, roaming, and availability schemes/rules. Furthermore, providers may apply rules among each other, thus generating consortiums of networks which can be considered from the point of view of a single NAD as a "home network" or "preferable roaming network". The general management of the connections and usages of the multiple NADs and different provider networks is very involved and not realized in a satisfying manner in current systems, considering the possible varieties of applying the above mentioned schemes and rules.

General management and architectural concepts for controlling a network by some application logic of a specific service are known in the art. In order to apply different devices of a telematic system according to the devices' individual capabilities, customer requirements, and/or provider restrictions on Quality of Service (QoS) strategies have been implemented in the past that, in particular, allow for end-to-end management of some terminal equipment. However, such strategies do not concern the management of multiple individual telematic devices (Network Access Devices) comprised in a terminal equipment but rather treat the entire terminal equipment as a single network access device (NAD). Moreover, conventionally the selection of networks for applications is associated with handovers wherein a single NAD is associated with the service application logic of an individual provider. Thus, there is still a need for an improved kind of managing the usage of multiple telematic devices of a terminal equipment in order to optimize performance and costs of user applications.

SUMMARY

The above-mentioned objects may be addressed by an example computer-implemented method for controlling a terminal system, such as an automotive terminal system, connectable to multiple provider networks and comprising multiple network access devices (NADs) and a computer system. The example method includes reading information on the physical and/or logical location of the terminal system, reading user configurations and content provider service layer agreements (SLAs), based on the read information, user configurations and content provider SLAs creating associations between applications to be run on the NADs, the NADs and the multiple provider networks, and based on the created associations and the information on the physical and/or logical location of the terminal system selecting one of the NADs and one of the provider networks for running one of the applications on the selected NAD and connecting the selected NAD with the selected provider network.

The provider networks may comprise any wide-area network, such as the Universal Mobile Telecommunications System (UMTS) network, a Global System for Mobile (GSM) Communications network (for example, 3G or 4G), and/or other networks. The NADs may be connected to the Internet under the control of the computer system. NADs may comprise mobile device as mobile phones or built-in devices fixedly installed in the terminal system. "Running applications" and "running services" are used interchangeable in the present disclosure. The described systems may include internet communication and telephony.

The computer-implemented method may be implemented in a computer system installed in any kind of vehicle, for example, an automobile. In such an example, the computer system may be part of an in-vehicle communication system. The computer system may enable the possibility to connect multiple NADs which may be applied as a single modem from the point of view of the applications in the car, thereby increasing the effective bandwidth for the applications running their data over the NADs and guaranteeing voice and packet-based (non-voice) data parallelism for applications associated with data and/or voice contents. For example, the computer system itself may not be enabled to establish a data communication connection with a provider network but may be configured to use the capability of the NADs to connect to the provider networks and manage the NADs as a bundled plurality of connections. Furthermore, the management logic for the NADs may be configured due to (e.g., based on) network consortium rules to select most suitable visible GSM or WLAN network of reach so that best performance for the application may be achieved at lowest cost.

By the above-described example method, performance and costs of applications run on NADs may be optimized due to provider configurations by applying provider rules for the selection of NADs and provider networks, for example. Moreover, restrictions for the usage of NADs and provider networks due to certain area- or country-specific regulations may be taken into account. For example, information on the physical location of the terminal system may be provided in order to determine such restrictions. The physical location may be determined by a Global Positioning System (GPS), for example. According to the example method, the physical location may be considered when selecting NADs and provider networks. Additionally or alternatively, the logical location may be taken into account. For example, the logical location may be identified by the provider signature of the mobile networks visible for the NAD mobile networks (e.g., in GSM networks these are the Mobile Network Code (MNC) and the Mobile Country Code (MCC), in WLAN networks this is the Service Set Identifier (SSID)). The logical location for the terminal system may be defined by the area identifications sent by provider networks that are configured to be received by the terminal system at a particular physical location, for example, via an NAD.

When applying the SLAs and regulations for a specific country wherein the terminal system is located, it may be advantageous not only to consider the physical location but also the logical provider network for connection associated with the specific country, since otherwise the SLAs may wrongly be applied in areas of country borders where radio signals of foreign networks can be received in addition to radio signals of the provider network associated with the specific country. Thus, SLAs for foreign provider networks and agreements on the content providers with access providers at roaming may correctly be applied by performance of the example method. If no matching of agreements can be achieved, the involved NAD may be restricted in or even excluded from usage of services. Further, similar application occurs in cases where restricted areas with separately owned networks and services apply, e.g., in cases of WLAN networks in administrative, military, production, or company areas, or airplane or ship environment, where the attachment to the area network may be forced and may apply only within the physical boarders of the area and the specific services and restrictions thereof within the area may follow the specific SLA within the area when performing the method. As a simple example thereof, it is assumed that when an NAD leaves the physical area, e.g., a building, though being still attached to the network of the building some services associated with the physical area will be restricted or will not work, but will work normally as soon as the device is again inside the building, or when entering the building the NAD is in a public network valid outside the building, the NAD may be forced to re-switch to the network of the building though both networks RF signals are available in parallel.

In order to efficiently manage operation of the terminal system associations between the applications, the NADs and provider networks are established. The term "association" as used herein may refer to assignment of individual NADs to applications or mapping between individual NADs and applications to be run on the individual NADs (and the respective media used by an application) and allowed connections of the NADs with the provider networks, respectively. According to the example method, information included in the user configurations and SLAs is read to allow for assigning a particular one of the NADs to some particular application and media. The method may comprise generating, for each of a plurality of applications and the associated media, a list of operable NADs. The information comprises particular constraints that, in principle, can be provided by a manufacturer, a user, and/or a provider of a service carried on the provider network. At least part of the information may be stored in a database of the terminal system. The information may particularly comprise a prioritization scheme of associations. For example, if more than one NAD is suitable for a particular application and media, each of these NADs can be given some priority value such that in the case that all or some of these NADs are actually available for the application/media, the available NAD with the highest priority can be selected.

According to an embodiment, the associations between applications to be run on the NADs, the NADs, and the multiple provider networks may be created based on device/network configurations stored in the NADs and read in addition to the user configurations and SLAs. The previously mentioned user configurations and SLAs that may be stored in a database of the terminal system may be matched with the device/network configurations stored in the NADs, and rules for the selection of provider networks for individual NADs, for example, stored in the database, may be modified in accordance with rules for the selection of provider networks stored in the NADs or vice versa. Rules of one of the user configurations, SLAs, and device/network configurations may overrule rules of another one of the user configurations, SLAs, and device/network configurations.

User configurations, SLAs, and device/network configurations stored in the NADs may include information on the identification of provider networks available in particular geographical areas and/or access providers associated with the NADs. The configurations and SLAs may include information on the identification of provider networks available in particular geographical areas and/or access providers associated with the NADs, and/or may include defining that particular ones of the NADs and/or a particular one of the provider networks is/are to be selected in particular countries. Device/network configurations may be provided by providers via the provider networks and may comprise SLAs.

The above-described example method may particularly allow for the selection of provider networks and NADs via service application logic included in the terminal system, for example, included in the computer system (see detailed description below). Thus, a plurality of NADs associated with different technologies and service layer agreements (SLAs) of different providers may effectively be managed. An SLA is part of the contract between the service consumer and service provider and formally defines the level of service. Desired functional requirements as well as quality attribute requirements may be described in a service level in the SLA. An SLA sets the expectations of both the service consumer and the service provider. Service providers may deliver services at different levels of quality based on the cost paid for a service. An SLA is valuable for helping all parties understand the tradeoffs inherent between cost, schedule, and quality because the associated relationships are stated explicitly. A properly specified SLA describes each service offered and may address questions of how delivery of the service at the specified level of quality will become realized, which metrics will be collected, who will collect the metrics, how actions are to be taken when the service is not delivered at the specified level of quality, who is responsible for doing the actions, penalties for failure to deliver the service at the specified level of quality, how and whether the SLA will evolve as technology changes, etc.

In some examples, SLAs may be assigned to applications defining whether an application is allowed by a particular provider. The terminal system understands and makes use of the SLAs. In addition, constraints with respect to the associations of NADs with providers are taken into account and particular applications and NADs are associated with each other based on the SLAs and such constraints. According to an example of the present disclosure, the SLA enforces NAD-provider network parameters/associations and restrictions to applications (and possibly media) of services provided by service provider via provider networks.

A user may upload his/her own user configurations (e.g., rules) for the management of the NAD and provider network in the terminal system. Such user configurations may comprise logics for associating applications, NADs, and provider networks. In principle, a positive logic may be employed in the configurations and SLAs defining that particular ones of the NADs and/or a particular one of the provider networks are to be selected in particular countries. Alternatively or additionally, a negative logic may be employed in the configurations and SLAs defining that particular ones of the NADs and/or particular ones of the provider networks are not to be selected in particular countries.

Examples for selection rules include that a first NAD is selected and at least one second NAD is not selected when the terminal system is determined to be in a first country and in all other countries at least one third NAD is selected or no NAD is selected at all. Other selection rules may include that a first NAD only is selected and a first provider network only is selected when the terminal system is determined to be in a first country and at least one second NAD is selected in all other countries or the first provider network is not allowed to be selected when the first NAD is selected if the terminal system is determined to be in the first country; or at least one third NAD is not allowed to be selected when the terminal system is determined to be in at least one first country and at least one of the at least one third NADs is selected when the terminal system is determined to be in the first country.

In the context of dynamically changing associations between NADs and provider networks the example method may comprise running an application on a first NAD connected to the provider network and subsequently changing connection of the provider network to a second NAD and continuing running the application on the second NAD. Users and providers may prioritize NADs and provider networks by the user configurations and SLAs, respectively.

According to an embodiment, the above-described elements are performed at a first physical location and the example method further comprises moving the terminal system from the first physical location to a second physical location different from the first physical location and newly selecting a particular NAD and a particular provider network for running a particular one of the applications on the newly selected NAD, and connecting the newly selected NAD with the newly selected provider network based on the created associations and the information on the physical location and/or logical location of the terminal system. The selection of the NADs and provider networks may be dynamically changed according to the movement of the terminal system from one location to another (e.g., from one country to another), and, thus, the temporally changing physical and logical locations.

According to another embodiment, the following further elements are included in the example computer-implemented method for controlling a terminal system: based on the created associations and the information on the physical and/or logical location of the terminal system, one of the NADs and one of the provider networks for running one of the applications on the selected NAD are selected. If allowed by an interface of the selected NAD, connection of the selected NAD with the selected provider network is enforced and, if the connection is not allowed by the interface of the selected NAD, operation of the application on the selected NAD is forbidden or at least restricted.

The disclosure further provides for a computer program product, comprising one or more computer readable media having computer-executable instructions for performing the elements of the example method according to one of the above-described examples. In addition, the disclosure provides a terminal system, such as an automotive terminal system installed in a vehicle, configured for connection to multiple provider networks, comprising multiple network access devices (NADs) configured for running applications, and a computer system configured for reading information on the physical and/or logical location of the terminal system, reading user configurations and content provider service layer agreements, based on the read information, user configurations and content provider service layer agreements creating associations between applications to be run on the NADs, the NADs and the multiple provider networks, and based on the created associations and the information on the physical and/or logical location of the terminal system, selecting a particular NAD and a particular provider network for running a particular one of the applications on the selected NAD and connecting the selected NAD to the selected provider network.

The computer system may be further configured to create the associations based on device/network configurations stored in the NADs and read by the computer system. The terminal system may further comprise a database configured for storing at least part of the information and the computer system may be further configured to read the at least part of the information from the database. For example, the terminal system may be an automotive terminal system installed in an automobile. All examples of the method for controlling a terminal system described above may be implemented in the terminal system.

Additional features and advantages of the present disclosure will be described with reference to the drawings. In the description, reference is made to the accompanying figures that are meant to illustrate preferred embodiments of the disclosure. It is understood that such embodiments do not represent the full scope of the disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
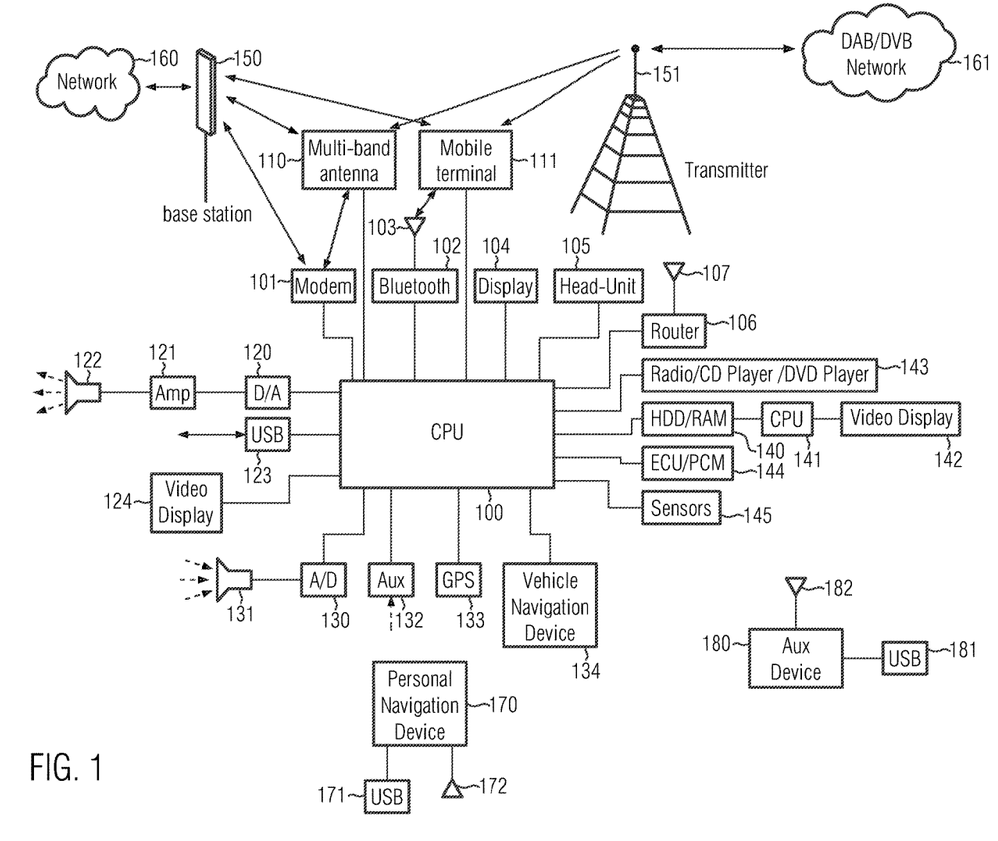
FIG. 1 shows an example automotive telematics system configured for communicating with a provider network in accordance with one or more embodiments of the present disclosure.

The present disclosure may include elements that are incorporated in an automotive telematic system. An example of an automotive telematic system is shown in FIG. 1. Components 100 to 145 and 170 to 182 are installed in a vehicle, while components 150 to 161 are external components that are not part of the automotive telematic system, but may interact with some of the telematic components of the vehicle.

A vehicle equipped with a telematic system may include a display 104, as a visual front end interface located in the vehicle. A user may also be able to interact with the interface via a touch sensitive screen, via pressing a button, via audible speech and speech synthesis, or other HMI (Human-Machine Interaction) components. Interaction via audible speech and speech synthesis and/or analysis may be performed via a microphone 131 and an A/D converter 130 for receiving input from the user and via a D/A converter 120, an amplifier 121, and one or several speakers 122 for presenting output to the user. The visual front end interface may be part of a head-unit for a centralized interaction of the user with the telematic system or separate from one or more dedicated head-units 105, (e.g., for interaction of the user with audio or telephony components of the telematic system).

In the illustrative embodiment shown in FIG. 1, a central processing unit 100, which may include a CPU, GPU, or an embedded system, controls at least a portion of the operation of the telematic system. However, the current disclosure is not limited to such control, and may provide at least one further processing unit assigned to a specific telematic component or a group of telematic components, as for instance a CPU 141 provided with a video display 142, for example, as part of a rear seat entertainment system for displaying movies from a storage device, such as a hard disk drive 140. The processing unit allows on-board processing of instructions, commands, and routines, particularly as part of an application component of the telematic system. The processing unit 100 may further be connected to both non-persistent and persistent storage devices 140. In this illustrative embodiment, the non-persistent storage device may include random access memory (RAM) and the persistent storage device may include a hard disk drive (HDD) and/or flash memory.

The processing unit 100 may also be provided with a number of different inputs allowing the user to interface with the processing unit. In this illustrative embodiment, a microphone 131, an auxiliary input 132, a Universal Serial Bus (USB) unit/input 123, a Global Positioning System (GPS) unit/input 133, and a Bluetooth unit/input 102 are all provided. In other examples, additional, fewer, and/or different combinations of inputs may be provided to the processing unit 100. An input selector may be provided to allow the user to swap between various inputs. Input to the microphone 131 is converted from analog to digital by an A/D converter 130 before being passed to the processing unit.

Outputs from the telematic system may include, but are not limited to, a video display 124 and a speaker 122 or stereo/surround system output. The speaker may be connected to an amplifier 121 and may receive a signal from the processing unit 100 through a digital-to-analog converter 120. Output may also be made via the Bluetooth transceiver 102 with a Bluetooth antenna 103 to a remote Bluetooth device such as a personal navigation device 170 with a Bluetooth antenna 172. Communication with a personal navigation device may also be achieved via one or more of USB connectors 123 and 171. The telematic system may further comprise a vehicle navigation device 134, which may interact with the GPS unit 133 and/or a mobile network 160 (e.g., a provider network) via a base station 150 and a multi-band antenna 110 or a mobile terminal 111. It should be noted, however, that according to an example of the disclosed terminal system and method for controlling the same, the processing unit may not have direct access to a provider network, but rather may have a wireless data connection to the provider network that is offered by wirelessly connected or fixedly installed NADs. The mobile terminal 111, being an example for an NAD, may in some examples be a cell phone, smart phone, PDA, or the like, and may be connected to the processing unit 100 either directly, via a USB connector 123, or via the Bluetooth transceiver 102 with associated antenna 103. The multi-band antenna 110 may exchange data with the processing unit 100 either through a wire or wirelessly through a modem 101. As illustrated, the base station 150 and the network 160 are not part of the telematic system, but are provided outside the vehicle. In some embodiment, the base station 150 may be a WiFi access point.

Data may be communicated between the central processing unit 100 and the network 160 utilizing, for instance, a data-plan, data over voice, or DTMF tones associated with the mobile terminal. Both multi-band antenna 110 and the mobile terminal 111 may exchange data bi-directionally with the base station or WiFi access point 150. The modem 101 may also communicate directly with a network 160 through communications with a cellular tower 150. As a non-limiting example, the modem 101 may be a USB cellular modem and the communication may be cellular communication.

In one illustrative embodiment, the processing unit 100 may be provided with an operating system including an API to communicate with modem application software. The modem application software may access an embedded module or firmware on the Bluetooth transceiver 102 to complete wireless communication with a remote Bluetooth transceiver (such as that of the mobile terminal 111). In another embodiment, the mobile terminal 111 may include a modem for voice band or broadband data communication. If the user has a data-plan associated with the mobile terminal 111, the data-plan may allow for broadband transmission and the telematic system may use a much wider bandwidth (speeding up data transfer). In still another embodiment, the mobile terminal 111 may be replaced with a cellular communication device (e.g., and without limitation, a modem 101), that is installed in the vehicle. In yet another embodiment, the mobile terminal 111 may be replaced with a wireless local area network (LAN) device capable of communication over, for example, an 802.11g network (e.g., WiFi) or a WiMax network. In one embodiment, incoming data can be passed through the mobile terminal 111 via a data-over-voice or data-plan, through the on-board Bluetooth transceiver 102 and into the central processing unit 100.

Data, whether incoming or outgoing or temporary, may be stored on the HDD 140, in the RAM 140, and/or in any other storage media until such time as the data is no longer requested or used. For example, the HDD 140 or other storage media may be used as the memory for storing generated log files until the reporter component transmits the log files to an external analyzer component. This transfer to an external analyzer component may be performed via the modem 101, the multi-band antenna 110, the Bluetooth transceiver 102, and/or the mobile terminal 111, (e.g., to a mobile network 160 or a wireless network).

The central processing unit may further be in communication with a variety of other auxiliary devices 180. These devices may be connected through wireless 182 or wired 181 connections (such as a USB connection). Also, or alternatively, the CPU 100 may be connected to a vehicle based wireless router 106, using for example a WiFi transceiver 107. This connection may allow the CPU to connect to remote networks in range of the local router 106.

The processing unit 100 may further interact with a radio, a CD player, and/or a DVD player 143 to provide audio and/or video to the stereo system 122 and/or a video display 142. Audio and/or video may also be provided via the multi-band antenna 110 and/or the mobile terminal 111 from a mobile network 160, wireless network, and/or digital broadcast provider network 161 (Digital Audio Broadcast, Digital Video Broadcast) via a broadcast transmitter 151 outside the vehicle. Audio and/or video data may be downloaded or streamed through the above described connections. In the case of a download, the data may be temporarily or persistently stored in the HDD 140 or other storage device. A further processing unit 141 may later read the stored data from the HDD 140 and provide video and/or audio service through the vehicle's speaker system 122 and/or a video display 142.

The processing unit 100 may further interact with a microphone 131 and/or the vehicle's speaker system 122 to provide hands-free telephony (e.g., via the mobile terminal 111). Similarly the processing unit 100 may interact with the mobile terminal 111 and vehicle diagnostics (not shown) to send an emergency call or a breakdown call (see further below).

The processing unit 100 may also interact with an engine control unit (ECU) 144 to control engine parameters or monitor the vehicle's engine. Similarly, the processing unit 100 may interact with a powertrain control module (PCM) 144 and a series of sensor systems 145, for example, but without limitation, a tire pressure monitoring system, a road condition sensor, a parking sensor, a temperature sensor, an ambient light sensor, and other sensor(s). Wired communications within the automotive telematic system may be carried out using MOST (Media Oriented Systems Transport), CAN (Controller Area Network), IEEE 1394, or other technologies.

Figure 2:
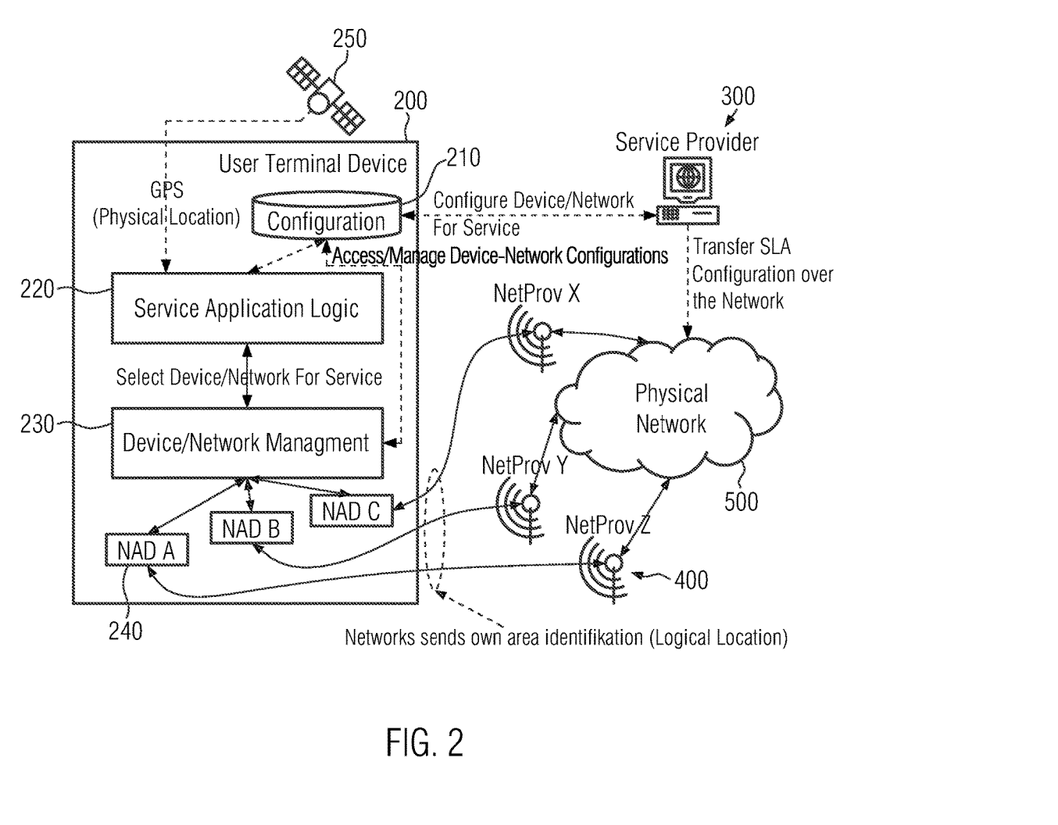
FIG. 2 shows example service and network architecture in accordance with one or more embodiments of the present disclosure.

FIG. 2 shows an example type of service network architecture in which the disclosed methods and systems may be implemented. A terminal system 200 installed in an automobile according to an example of the disclosure is provided. The terminal system 200 comprises a configuration database 210. A user of the terminal system 200, as well as a service provider 300, may upload management rules for applications to be run on NADs, NADs, and provider networks 400 to the configuration database 210. In particular, these rules may be implemented in user configurations and provider SLAs, respectively.

Furthermore, the terminal system 200 comprises some service application logic 220. The service application logic 220 may be included in a central processing unit and may be configured to control associations between applications, NADs, and provider networks based on the information stored in the configuration database 210. For example, the service application logic 220 may control connection of NADs to provider networks 400 that are connected with the service provider 300 via a physical network 500.

The provider networks 400 may include technologies such as Wireless Local Area Network (WLAN) and/or a General Packet Radios Service (GPRS) network and/or a Global System for Mobile Communications (GSM) network and/or a Universal Mobile Telecommunications System (UMTS) and/or Long-Term-Evolution (LTE) network. All of the above-described technologies belong to IEEE (Institute of Electrical and Electronics Engineers) or 3GPP (3rd Generation Partnership Project) standardization efforts and details thereof may be referred to at the respective standardisation board(s). The data exchanged via the provider networks 400 may be, in general, IP-data that may be static data such as text or dynamic data such as voice, video, etc., or any digitally coded data such as GSM-voice or SMS-text, depending on the used coding and protocols for these information types.

The service provider 300 may upload configurations/rules in the configuration database 210 via a provider network 400 and/or the physical network 500. The service application logic 220 may cooperate with a device/network management unit 230 in a way that it evaluates which networks are currently visible for the NADs and which NADs are currently available. The device/network management unit 230 may collect the information on the NADs, network(s), and/or associated availabilities and report this data to the application logic 220. The device/network management unit (230) may also provide to the application logic (220) an interface whereby a specific network for a NAD and a specific NAD may be selected. The service application logic 220 may than select for associated media the most suitable network and the most suitable NAD as defined via the configuration rules of the service provider 300 by forcing the NAD to attach to a specific network and using the respectively selected NAD with the respectively selected network In FIG. 2, the device/network management unit 230 is directly connected with NADs 240, (for example, mobile phones or PDAs). In the shown example, according to the information uploaded in the configuration database 210, the service application logic 220 controls connection of NAD A with provider network Z, NAD B with provider network Y and NAD C with provider network X. The respective connections may be controlled by the service application logic 220 based on information on the physical location obtained by a GPS means 250, for example, and the logical location provided by the provider networks in form of area identification (e.g., codes).

In the example shown in FIG. 2, the NADs 240 represent network access interfaces for connection with the provider networks 400 for applications running on the NADs 240 or a computational unit (for example, the central processing unit wherein the service application logic 220 is included) of the terminal system. The NADs may belong to different service providers 300 and may be associated with different payment schemes and roaming rules. Both a user of the terminal system 200 and a service provider 300 providing services for the terminal system of the automobile may define rules for the optimal selection of the NADs for offered services depending on the physical area wherein the terminal system 200 is located and/or the available provider networks 400. These rules may be uploaded in the configuration database 210 and accessed by the service application logic 220 and device/network management unit 230. Additionally, the individual NADs 240 may be provided with internally stored rules in the form of or included in device/network configurations for the automatic selection of one of multiple network technologies (for example, GSM 3G or 4G). In particular, the NADs 240 may be configured to inform the service application logic 220 about their individual capabilities and configurations, for example, for the network management. Rules stored in the NADs 240 and the configuration database 210 may be matched by the service application logic 220. The service application logic 220 may modify rules stored in the NADs 240 according to rules stored in the configuration database 210 or vice versa.

If a particular NAD 240 allows full management of the same by the service application logic 220, the service application logic 220 may take over full control of the NAD 240 and adapt that NAD according to the rules uploaded in the configuration database 210 by a user and/or service provider 300. If a particular NAD 240 does not allow full management of the same from the service application logic 220, the service application logic 220 may adapt associations of applications, NADs 240, and provider networks 400 to the automatic network management rules stored in the NAD 240 or may exclude the NAD 240 from services, if the configuration of that NAD does not fit to the configuration/SLAs stored in the configuration database 210 by a user and/or service provider 300 at least at particular physical locations of the terminal system 200.

In the following, particular examples for rules for the selection of associations of NADs 240 with provider networks 400 stored in the configuration database 210 by a user and/or service provider 300 are described. For a particular application, exemplary rules may read:

Select NADs A and B only for any provider network X, Y, Z

If the physical location is country I, select NADs A and B only and if the physical location is country II, only NADs A and C; at all other physical locations do not allow the application to be run If the physical location is country I or II, select NADs A and B only, at all other physical locations select NAD C If the physical location is country I, select provider network X and NAD A and at all other physical locations select NADs B and C whatever provider network is available The above-described rules positively define selection of NADs 240 and provider networks 400 (positive logic). Alternatively or additionally, purely negative rules (negative logic) may be applied, for example:

If the physical location is country I, never select provider network X for NAD A.

If the physical location is country I or 2, never select NADs B and C.

A purely negative logic defining only areas and provider networks that are not allowed to be used may be advantageous in terms of shorter descriptions. In the following, a concrete example for the definition and application of a network and device selection scheme is given in terms of a formal format protocol.

A general term for the configuration of networks and devices reads as follows:

(Ara_Network_ID(Network_Network_ID1, Network_Network_ID2, . . . , Network_Network_ID N):Dev1, Dev2, . . . , DevX).

In order to apply this scheme SLA devices are ordered due to their required order of application. The content provider and the user may determine/define how to prioritize devices and networks, and the provided HMIs for such actions may determine/define how the respective data is input into the system. An exemplary formal format protocol of such an SLA is defined as the protocol is to be applied within the system application logic after being translated from an HMI or Data-Base input of user or provider configuration. However, the format may be general enough to be also applied in any software entity associated with device and network configurations.

The protocol may be specified using Augmented Backus-Naur Form (ABNF) and may assume that networks may use either single identification name or number, or 2 IDs (like GSM) to identify the logical network:

```
multinet_environment_term = 1*( "(" ( network_ids /
   negative_network_ids)
":" network_devices ")" )
   name_symbols = ALPHA / DIGIT / mark
   mark = "-" / "_" / "." / "~" / "§" / "<" / ">" / "|" / "\" / "°" /
   "!" / "$" / "&" / "+" /
";" / "=" / "/" / "?" / "#" / "[" / "]" / "@"
   network_ids = network_id ["," 1*(network_id)]
   network_id = area_network_id [ "(" network_network_ids ")" ]
   network_network_ids = network_network_id ["," 1*(
   network_network_id )]
   area_network_id = "*" / 1*(name_symbols)
   network_network_id = 1*(name_symbols)
   negative_network_ids = negative_network_id ["," 1*(
   negative_network_id)]
   negative_network_id = "^" negative_area_network_id [ "("
negative_network_network_ids ")" ]
   negative_network_network_ids = "^" network_network_ids
   negative_area_network_id = 1*(name_symbols)
   network_devices = network_device ["," 1*(network_device)]
   network_device = 1*(name_symbols)
```

Special values of the protocol may include:

Default Term for all or all the rest of networks is a wild-card "*", e.g. (*:Dev1,Dev2,Dev3), see "area_network_id".

The term for forbidden device is expressed through not listing of the device in the specific configuration, e.g. Devices Dev1, Dev2 and Dev3 are available in the system but the configuration associated with an application or a media is (*:Dev2,Dev3), e.g., the meaning of this term for a specific application is "use for any network only devices Dev2 and Dev3".

By not using a wild card for the network but listing the networks specifically, those networks that are not listed are not applicable for the respective application or media configuration. This rule applies both to the "area_network_id" and the "network_network_id" subparts of the "network_id", e.g.:

Multi-Network configuration in different countries using GSM IDs (Area_Network_ID in GSM networks is named NMCC and Network_Network_ID in GSM networks is NMNC: (262:1,2,3)(204:2,3), e.g., in Germany (NMCC=262) use devices 1, 2 and 3 and in Holland (NMCC=204) use just devices 2 and 3. In all other countries the application is not allowed.

Common configuration for multiple countries: (262,204: 2,3)(*:1), e.g., in Germany and Holland use just devices 2 and 3, in all other countries use 1, for the application.

Selection of specific networks in a country: (262(001, 006):1)(*:2,3), e.g., in Germany use just the T-Mobile networks (NCNC=001 and 006) with device 1 and in all other countries devices 2 and 3 independently of the access-provider network.

If the rule is valid in a complete area the usage of the specific provider-network definitions for the area can be omitted, hence the definition of "network_network_id" is optional in "network_id" (see the examples in the previous point of this list).

As already mentioned in some cases and for the purpose of shorter description it is more convenient to express the network terms with negative logic, e.g., to describe only the area and provider networks which shall not be used. Note that it is not allowed to use the positive and the negative logic for expressing the area and provider networks in a mixed mode for one and the same area of application as this will cause ambiguities in the expression which networks are allowed and which forbidden.

Furthermore, if using only the area term, it is not allowed to mix positive and negative logic in association with the same device, as this will also cause ambiguities. Examples for the negative logic are:

(^262(^001,006):1)—In Germany it is not allowed to use the networks of T-Mobile for device 1, all other networks are allowed (^262,204:2,3)—Devices 2,3 shall not be used in Germany and Holland, in all other countries the devices are allowed.

Figure 3:
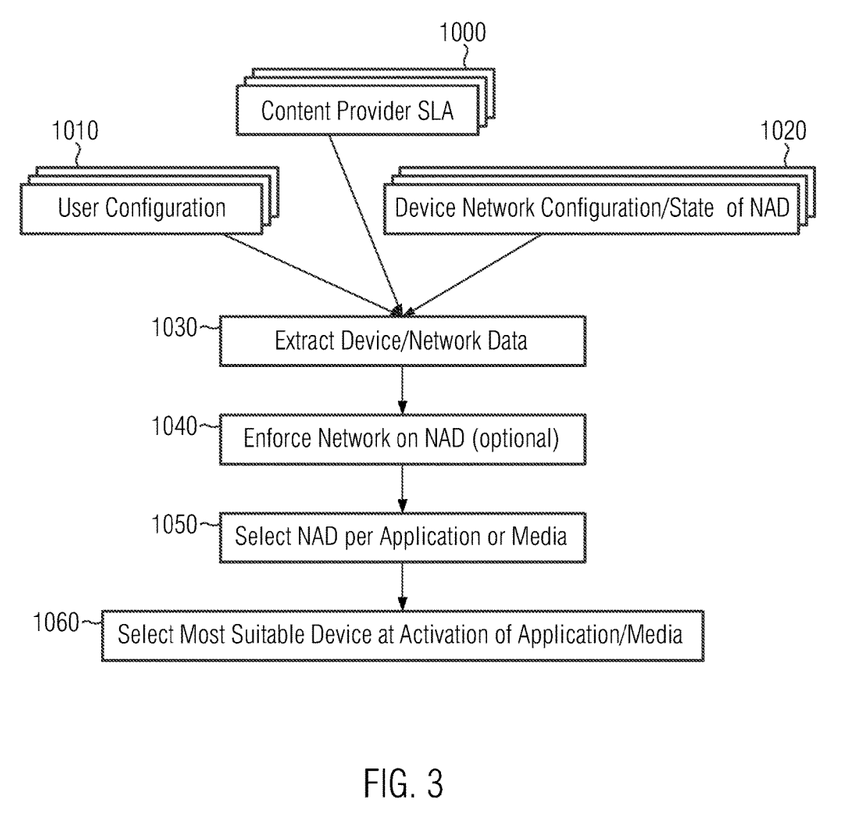
FIG. 3 is a flow diagram illustrating an example method for controlling a terminal system based on content provider SLA and user and device/network configurations in accordance with one or more embodiments of the present disclosure.

FIG. 3 shows a flow diagram illustrating an example of a method for controlling a terminal system based on provider SLAs, user configurations, and device/network configurations. Associations between applications, NADs, and provider networks may be defined in the SLAs, user configurations, and device/network configurations. The SLAs, user configurations, and device/network configurations may give selection rules for selecting a particular NAD for a particular application in combination with a particular provider network depending on the physical and/or logical location of the terminal system.

FIG. 3 illustrates an algorithm for using SLAs (for example, provided by a service provider) for selecting NADs and provider networks for particular applications and possibly media. In GSM networks, media may include voice data and non-voice packet-based data, e.g. for any IP-transport purposes. In general, the packet-based data may be considered also as different media types in consideration with the fact which coding mechanisms for the media is applied, e.g. Hypertext Transfer Protocol (HTTP) for any text and non-streaming data, or Real-Time Protocol (RTP) for streaming data like music or video, etc. Some applications may include telephony, Internet browsing/uploading/downloading, mailing, navigating, etc. Mobile phones, mobile computers and Personal Digital Assistants are representative examples for the NADs.

In order to obtain a singular selection of a particular NAD for a particular application using a particular provider network, election and filtering may be performed for multiple options given by configurations defining possible associations of applications, NADs, and provider networks. As shown in FIG. 3, a service provider provides a content provider SLA 1000 defining selection rules for applications, NADs, and provider networks. A user of a terminal system as described with reference to FIGS. 1 and 2, for example, provides user configuration data 1010 defining selection rules for applications, NADs, and provider networks. Moreover, an NAD has its own device/network configuration 1020 stored therein. The provider SLA 1000 and user configuration data 1010 (for example, stored in the configuration database 210 of FIG. 2) are matched with the device/network configuration 1020 of the NAD (for example, by the service application logic 220 shown in FIG. 2). The device/network configuration 1020 of the NAD may be received for the matching process via the device/network management unit 230 of FIG. 2 to which the NAD is connected via an NAD interface. All relevant device/network association data are extracted 1030 for individual applications. The different configurations/rules provided by the provider, user, and NAD may be prioritized. For example, according to the extracted configurations/rules, the NAD may be forced 1040 to connect with a specific provider network when a particular physical location of the terminal system and thereby the NAD is determined and/or a particular area identification code of a provider network servicing the physical location is received by the terminal system (for example, via an NAD). If the NAD cannot be forced to exclusively connect to the provider network specified by the area identification, the NAD may be restricted in or excluded from a service.

Based on the extracted device/network association data 1030 each application (and the used media) is associated with a least one NAD and at least one provider network. For each application an NAD may be selected 1050 for a device/network association. The device/network association may include the above-mentioned rules of positive and negative logics, for example. Particularly, the device/network association includes multiple associations of NADs and provider networks from which a particular one may be selected, for example, for a given physical location and/or a given received area identification of a provider network.

When a particular application (and/or media) is activated, the most suitable NAD with its device/network association may be selected from the multiple associations available. The selection may be based on a prioritization scheme included in the device/network association (and the provider SLA 1000 and/or user configuration 1010 and/or device/network configuration 1020 of the NAD). Accordingly, the provider SLA 1000 and/or user configuration 1010 may enforce device/network associations for and restrictions of applications in a reliable manner. The prioritization scheme may take into account costs of applications and demands for interrupt-free data transfer, etc.

All previously discussed embodiments are not intended as limitations but serve as examples illustrating features and advantages of the disclosure. It is to be understood that some or all of the above described features can also be combined in different ways. The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the CPU 100, user terminal device 200, NADs 240, and/or service provider 300 described with reference to FIGS. 1 and 2. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A computer-implemented method for controlling a terminal system connectable to multiple provider networks, the terminal system comprising multiple network access devices (NADs) and a computer system, and the computer-implemented method comprising:
   accessing information on either a physical location and a logical location of the terminal system or the logical location only of the terminal system, the logical location of the terminal system being area identifications that are sent by the multiple provider networks and that are able to be received by the terminal system at a particular physical location;
   accessing user configurations and provider service layer agreements, wherein each of the service layer agreements is part of a contract between a user and a service provider and formally defines a level of service;
   based on the accessed information, user configurations, and provider service layer agreements, creating associations between applications to be run on the NADs, the NADs, and the multiple provider networks; and
   based on the created associations and the information on the one or more of the physical location and the logical location of the terminal system, selecting one of the NADs and one of the provider networks for running one of the applications on the selected NAD and connecting the selected NAD with the selected provider network, and
   wherein the provider service layer agreements are assigned to one or more applications and define whether each application is allowed by a particular provider, the method further comprising running an application on a first NAD connected to the provider network and subsequently changing connection of the provider network to a second NAD and continuing running the application on the second NAD in accordance with the provider service layer agreements.

2. The computer-implemented method according to claim 1, wherein the associations between applications to be run on the NADs, the NADs, and the multiple provider networks are created based on one or more of device and network configurations stored in the NADs.

3. The computer-implemented method according to claim 2, wherein the one or more of device and network configurations include information on identification of at least one of provider networks available in particular geographical areas and access providers associated with the NADs.

4. The computer-implemented method according to claim 2, wherein the one or more of device and network configurations specify selection and prioritization logics for NADs and provider networks for services provided by the provider networks.

5. The computer-implemented method according to claim 2, wherein a positive logic is employed in the one or more of device and network configurations defining that particular ones of the NADs or particular ones of the provider networks are to be selected in one or more countries.

6. The computer-implemented method according to claim 2, wherein a negative logic is employed in the one or more of device and network configurations defining that particular ones of the NADs or particular ones of the provider networks are not to be selected in one or more countries.

7. The computer-implemented method according to claim 1, wherein the accessing information, accessing user configurations, creating associations, and selecting one of the NADs and one of the provider networks are performed at a first physical location and the method further comprising moving the terminal system from the first physical location to a second physical location different from the first physical location and newly selecting a particular NAD and a particular provider network for running a particular one of the applications on the newly selected NAD and connecting the newly selected NAD with the newly selected provider network based on the created associations and the information on the one or more of the physical location and the logical location of the terminal system.

8. The computer-implemented method according to claim 1, further comprising, based on the created associations and the information on the one or more of the physical location and the logical location of the terminal system, selecting one of the NADs and one of the provider networks for running one of the applications on the selected NAD, and if allowed by an interface of the selected NAD, enforcing connection of the selected NAD with the selected provider network, and if not allowed by the interface of the selected NAD, forbidding or restricting operation of the application on the selected NAD.

9. The computer-implemented method according to claim 1, wherein a first NAD is selected and at least one second NAD is not selected when the terminal system is determined to be in a first country and, in all other countries, at least one third NAD is selected or no NAD is selected at all.

10. The computer-implemented method according to claim 1, wherein the selecting one of the NADs and one of the provider networks is performed based on one or more rules, the rules including one or more of:
    a first NAD only is selected and a first provider network only is selected when it is determined that the terminal system is in a first country and at least one second NAD is selected in all other countries,
    the first provider network is not allowed to be selected when the first NAD is selected when the terminal system is determined to be in the first country,
    at least one third NAD is not allowed to be selected when the terminal system is determined to be in at least one first country and at least one of the at least one third NADs is selected when the terminal system is determined to be in the first country, and
    one or more NAD or network selection or restriction rules that are applied according to predefined positive or negative selection logic for the NADs and the provider networks.

11. A computer program product, comprising:
    one or more computer readable hardware storage devices having computer-executable instructions for:
        accessing information on either a physical location and a logical location of a terminal system or the logical location only of the terminal system, the logical location of the terminal system being area identifications that are sent by multiple provider networks and that are able to be received by the terminal system at a particular physical location;
        accessing user configurations and provider service layer agreements, wherein each of the service layer agreements is part of a contract between a user and a service provider and formally defines a level of service;
        based on the accessed information, user configurations, and provider service layer agreements, creating associations between applications to be run on multiple network access devices (NADs), the NADs, and the multiple provider networks, wherein the provider service layer agreements are assigned to one or more applications and define whether each application is allowed by a particular provider;

based on the created associations and the information on the one or more of the physical location and the logical location of the terminal system, selecting one of the NADs and one of the provider networks for running one of the applications on the selected NAD and connecting the selected NAD with the selected provider network; and running an application on a first NAD connected to the provider network and subsequently changing connection of the provider network to a second NAD and continuing running the application on the second NAD in accordance with the provider service layer agreements.

12. The computer program product according to claim 11, wherein the associations between applications to be run on the NADs, the NADs, and the multiple provider networks are created based on one or more of device and network configurations stored in the NADs.

13. The computer program product according to claim 12, wherein the one or more of device and network configurations include information on one or more of identification of provider networks available in particular geographical areas and access providers associated with the NADs.

14. The computer program product according to claim 12, wherein the one or more of device and network configurations specify selection and prioritization logics for NADs and provider networks for services provided by the provider networks, and wherein the provider service layer agreements describe each service offered and one or more of parameters of metrics that will be collected, parameters of delivery of each service offered, and parameters of actions that are taken when each service is not delivered at a specified level of quality.

15. The computer program product according to claim 12, wherein a positive logic is employed in the one or more of device and network configurations defining that particular ones of the NADs or particular ones of the provider networks are to be selected in one or more countries.

16. The computer program product according to claim 12, wherein a negative logic is employed in the one or more of device and network configurations defining that particular ones of the NADs or particular ones of the provider networks are not to be selected in one or more countries.

17. A terminal system configured for connection to multiple provider networks, the terminal system comprising:

multiple network access devices (NADs) configured for running applications; and a computer system including a processor and a storage device storing instructions executable by the processor to:

access information on either a physical location and a logical location of the terminal system or the logical location only of the terminal system, the logical location of the terminal system being area identifications that are sent by the multiple provider networks and that are able to be received by the terminal system at a particular physical location;

access user configurations and provider service layer agreements, wherein each of the service layer agreements is part of a contract between a user and a service provider and formally defines a level of service, wherein the provider service layer agreements are assigned to one or more applications and define whether each application is allowed by a particular provider;

based on the accessed information, user configurations, and provider service layer agreements, create associations between applications to be run on the NADs, the NADs, and the multiple provider networks;

based on the created associations and the information on the one or more of the physical location and the logical location of the terminal system, select a particular NAD and a particular provider network for running a particular one of the applications on the selected NAD and connecting the selected NAD to the selected provider network; and run an application on a first NAD connected to the provider network and subsequently change connection of the provider network to a second NAD and continue running the application on the second NAD in accordance with the provider service layer agreements.

18. The terminal system of claim 17, wherein the terminal system is an automotive terminal system installed in a vehicle, and wherein the provider service layer agreements define how and whether the provider service layer agreements will evolve as technology changes.

19. The terminal system of claim 17, wherein the computer system is further configured to create the associations based on one or more of device and network configurations stored in the NADs.

* * * * *